(12) United States Patent
Kniss et al.

(10) Patent No.: US 7,335,891 B2
(45) Date of Patent: Feb. 26, 2008

(54) GAMMA AND NEUTRON RADIATION DETECTOR

(75) Inventors: Timothy Albert Kniss, Cuyahoga Falls, OH (US); Alok Mani Srivastava, Niskayuna, NY (US); Steven Jude Duclos, Clifton Park, NY (US); Thomas Francis McNulty, Ballston Lake, NY (US); Sergio Paulo Martins Loureiro, Saratoga Springs, NY (US); Lucas Lemar Clarke, Uniontown, OH (US); Kent Charles Burr, Latham, NY (US); Adrian Ivan, Niskayuna, NY (US); Thomas Robert Anderson, Perry, OH (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 11/160,500

(22) Filed: Jun. 27, 2005

(65) Prior Publication Data

US 2007/0029493 A1 Feb. 8, 2007

(51) Int. Cl.
*G01T 1/20* (2006.01)
(52) U.S. Cl. .................................. 250/370.11
(58) Field of Classification Search ............ 250/370.09
See application file for complete search history.

(56) References Cited

U.S. PATENT DOCUMENTS

| | | | | |
|---|---|---|---|---|
| 5,399,869 A | * | 3/1995 | Usuda | 250/486.1 |
| 5,557,108 A | * | 9/1996 | Tumer | 250/390.04 |
| 6,867,444 B1 | * | 3/2005 | Hughes | 257/252 |
| 6,909,098 B2 | * | 6/2005 | Bross et al. | 250/367 |
| 7,026,627 B2 | * | 4/2006 | Fowler et al. | 250/394 |
| 7,038,211 B2 | * | 5/2006 | Bross et al. | 250/368 |
| 7,126,148 B2 | * | 10/2006 | Murray et al. | 250/269.4 |
| 7,244,947 B2 | * | 7/2007 | Polichar et al. | 250/390.01 |
| 2004/0119008 A1 | * | 6/2004 | Williams et al. | 250/256 |
| 2005/0023479 A1 | * | 2/2005 | Grodzins | 250/390.11 |
| 2005/0082484 A1 | | 4/2005 | Srivastava et al. | 250/361 |
| 2005/0104002 A1 | * | 5/2005 | Shah | 250/363.03 |
| 2005/0121618 A1 | * | 6/2005 | Fowler et al. | 250/394 |
| 2005/0127300 A1 | | 6/2005 | Bordynuik | 250/361 R |
| 2005/0236577 A1 | * | 10/2005 | Katagiri | 250/390.11 |
| 2006/0093088 A1 | * | 5/2006 | Sowerby et al. | 378/63 |

FOREIGN PATENT DOCUMENTS

WO    WO 01/60944 A2    8/2001
WO    WO 01/60945 A2    8/2001

OTHER PUBLICATIONS

Guillot-Noel O., Optical and scintillation properties of cerium-doped LaCl3, LuBr3 and LuCl3, Dec. 1999, Journal of Luminescence, vol. 85, Issues 1-3, pp. 21-35.*
Stedman R., Scintillator for Thermal Neutrons using Li6F and ZnS (Ag), Oct. 1960, Review of Scientific Instruments, vol. 31, Issue 10, p. 1156.*

* cited by examiner

*Primary Examiner*—David Porta
*Assistant Examiner*—David S Baker
(74) *Attorney, Agent, or Firm*—Cantor Colburn LLP

(57) ABSTRACT

A sensing element or detector activated by radiation comprising a first scintillator activated by gamma radiation; and a neutron sensing layer comprising a second scintillator activated by neutron radiation.

31 Claims, 12 Drawing Sheets

PMT 18
Scintillator 1 12
Reflectors 22
16 Neutron-Sensing Composite Layer
14 Scintillator 2
28 Photodiode

FIG. 13

PMT 18
Scintillator 1 12
Reflectors 22
28 Photodiode
14 Scintillator 2
16 Neutron-Sensing Composite Layer

GAMMA AND NEUTRON RADIATION DETECTOR

BACKGROUND OF THE INVENTION

Due to increased terrorist activity, there is a need for practical and high resolution gamma and neutron radiation detectors which can detect radioactive "dirty bombs" and other sources of radiation. Further, hand held or portable devices including for example, Hand Held Radioisotope Identification Devices (HHRIID's) are in high demand. Newer standards such as ANSI N42.33 (Type I) and ANSI N42.34 have also been specified due to the increased performance demands.

The typical approaches to gamma-radiation spectroscopy utilize NaI, CsI, Cadmium Zinc Telluride (CZT), Bismuth Germanate (BGO) or High Purity (HP) Germanium as direct-detection or scintillator materials. A desirable radiation detector able to simultaneously detect gamma- and neutron-radiation should demonstrate improved functionality and identification performance, i.e., it should be able to distinguish if suspect radiation is Naturally Occuring Radioactive Materials (NORM), Special Nuclear Materials (SNM), Medical, Industrial isotope or combination thereof, be easily deployable, and have low total cost of ownership.

Improved identification performance relies heavily on energy resolution, for which a HP Ge based detector would have nearly ideal characteristics. However, the need for cryogenic cooling, and materials cost in this type of detector severely impacts functionality, deployment, and total cost of ownership. Other materials solutions such as NaI, CsI(TI) or (Na), or CZT suffer from low energy resolution, high price, or inability to obtain sufficiently large volumes, which will also preclude meeting the above mentioned requirements and/or U.S. Homeland Security requirements for HHIRID's.

The problem has generally been addressed by separating the gamma and neutron components into two separate detector materials. Most of the existent combinations of simultaneous gamma and neutron detection use materials combinations that do not allow adequate identification, are not easily deployable, and/or have high total cost of ownership.

Thus, a high-resolution combined neutron and gamma radiation detector that helps to address at least some of the concerns above is needed.

BRIEF DESCRIPTION OF THE INVENTION

An embodiment may comprise a sensing element activated by radiation comprising a first scintillator activated by gamma radiation; and a neutron sensing layer comprising a second scintillator activated by neutron radiation.

An embodiment may also comprise a radiation detector allowing both gamma and neutron detection comprising a radiation sensing element comprising a gamma radiation sensing first scintillator and a neutron sensing second scintillator; and a photosensor.

BRIEF DESCRIPTION OF THE DRAWINGS

The following descriptions of various exemplary embodiments are not intended to be, and should not be considered to be, limiting in any way.

DETAILED DESCRIPTION OF THE INVENTION

Figure 1:
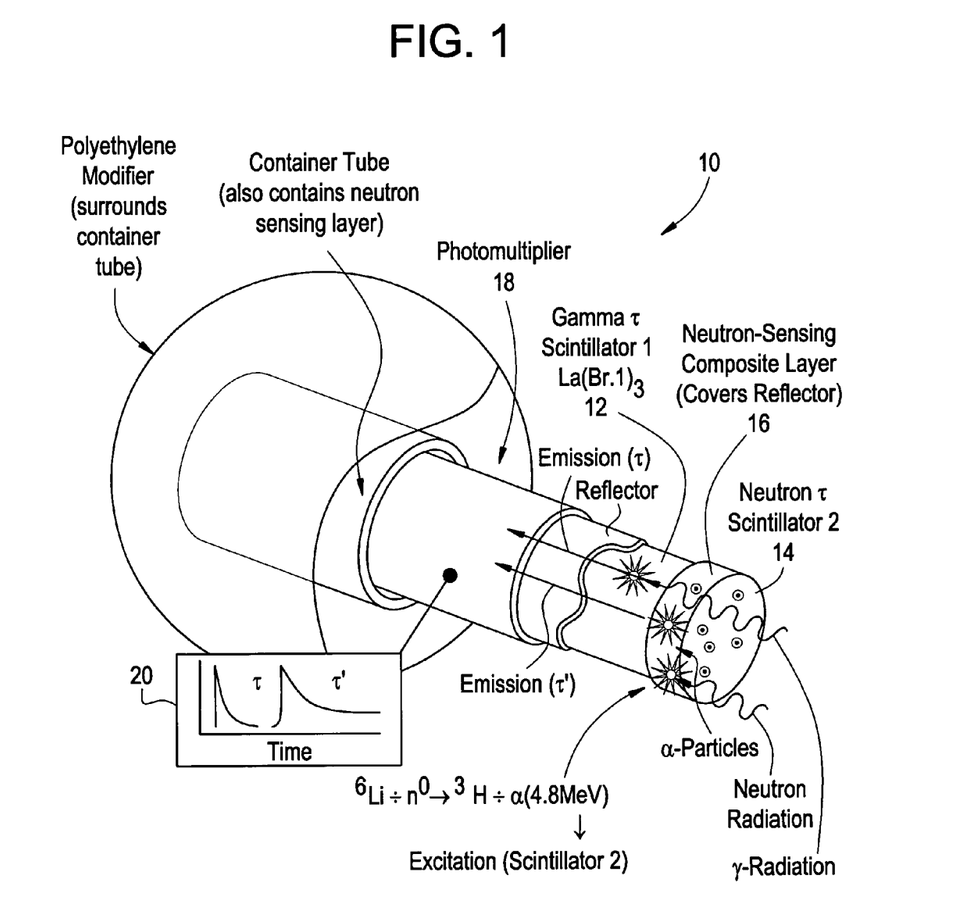
FIG. 1 shows a perspective view of a first embodiment which represents a first integrated sensor approach, i.e., optically coupling two scintillators.

FIG. 1 shows a first embodiment which represents a first integrated sensor approach, i.e., optically coupling two scintillators as compared to a second approach having separated sensors discussed subsequently below at the SECOND APPROACH section.

First Approach

In one version of the first approach shown in FIG. 1, a method and system for a detector allowing simultaneous detection of gamma and neutron-radiation using a single sensing element 10 with optical coupling between two scintillators (12, 14) and a dual material approach is introduced.

Specifically, the gamma and neutron detector described in FIG. 1, makes use of two different light emitting scintillator materials (12, 14) (one for gamma detection 12 and one for neutron detection 14), a photosensor (see photomultiplier (PMT) 18), and electronics (not shown). When radiation collides with the scintillators, light is emitted and detected by the photosensor.

The electronics process electronic signals from the photosensor, and thereby determine whether a given event is indicative of a gamma ray or a neutron radiation. In the case of gamma rays, the electronics also determine the energy of the gamma ray based on the amount of charge generated in the photosensor. The scintillators (12, 14) are specifically chosen so that they have different response times, making it possible to discriminate between gamma and neutron radiation based on pulse-shape analysis. In FIG. 1, the sensing element 10 may include a first $LaX_3:Ce$ (X=Cl, Br, I) scintillator material 12, with characteristic primary speed $\tau$, that is able to detect gamma-radiation. Additionally, a neutron sensing composite layer 16 is coupled to a photomultiplier tube (PMT) 18. The neutron sensing composite layer 16 contains both elements with high neutron cross-section and a second scintillator 14 designed to scintillate with primary speed τ', which is different from the first scintillator 12.

Thus, as shown in FIG. 1, this system will use a dual material approach, comprising a first scintillator 12 with characteristic primary speed, τ, able to detect γ-radiation. Also included is a neutron sensing composite layer 14, and both are coupled to a PMT 18. The neutron sensing composite layer 14 is formed by elements with high neutron cross-sections that are selected to yield alpha particles according to the nuclear reaction associated to the particular element(s) chosen, and a dispersion of a second scintillator 14 with a characteristic primary speed, τ'. This neutron sensing composite layer 14 is virtually transparent to incoming γ-radiation, which will be collected by the first scintillator 12 and detected by the same PMT 18 with its own characteristic primary speed, τ. Using proven pulse discrimination methods to take advantage of the difference in primary speed (τ≠τ') between the scintillators, this dual material approach simultaneously detects both γ-, and neutron-radiation with a single photosensor and electronics package. This embodiment is aided by the development and optimization of a novel class of mixed lanthanum halides $LaX_3$:Ce (X=Br, I) γ-scintillator materials, which have outstanding energy resolution that will consequently enable high-performance room temperature detectors at considerably lower cost when compared to current technologies such as cryogenically cooled high purity Germanium (HP Ge).

Significantly, the present embodiment uses mixed lanthanum halides which have outstanding physical properties (high scintillation efficiency, high energy resolution) and enable a high-performance detector at considerably lower cost when compared to current detection technologies such as high purity Germanium (HP Ge). The present embodiment may also be used at room temperatures without cryogenic cooling, making it ideal for portable or hand held detectors. The neutron-sensing composite layer 16 will use currently available materials, and will be integrated into a photodetection system composed of off the shelf PMT 18 and electronic components.

Neutron Detection

Neutron radiation detection is generally carried out using proven technologies such as He or $BF_3$ gaseous proportional counters. Gas-based detectors are limited in terms of packaging and sensitivity, thus are not practical for applications such as HHRIIDs. Here as shown in FIG. 1, we propose a different approach allowing detection and discrimination using the same photosensor and electronics package as used for the γ-radiation detection. Neutron-capture and subsequent detection will be accomplished by using a neutron-sensitive composite layer 16 mounted between the first γ-scintillator 12 and the detector cap. As previously stated, this layer 16 is selected to contain element(s) with high neutron cross section which are able to generate high-energy particles as a result of the nuclear reaction, and be virtually transparent to incoming γ-radiation. In addition, the neutron sensing composite layer 16 will contain a second scintillator material 14 that will capture the resulting high-energy alpha particles and convert their energy to luminescence that will be detected by the PMT 18. The second scintillator 12 should have low density, emit where the PMT is sensitive (300-500 nm), must not excite the La(Cl, Br, I)$_3$ emission nor be excited by the La(Cl, Br, I)$_3$ emission, and should have a primary speed sufficiently different from that of the first γ-scintillator 12. A suitable system is the commercially available $^6$LiF/ZnS:Ag composite that will use the $^6$Li+n$^0$->$^3$H+α (4.8 MeV) reaction, resulting in 450 nm emission with 80 μs decay time (see also the decay time diagram 20).

Second Approach

A second approach involves separating and not optically coupling the two scintillators (12, 14), which effectively separates the detectors from each other. This approach describes methods and geometries for avoiding problems caused by optical absorption of the scintillation photons from one scintillator in the other scintillator in detection systems which require two scintillators. Possible problems with optical absorption are avoided by eliminating the need to have the two scintillators optically coupled to each other. In some of the contemplated embodiments, detection may be achieved either by coupling one of the scintillators to wavelength-shifting fibers which transport the signal to a single photosensor (which also directly receives photons from the second scintillator) or by incorporating a second photosensing element, such as a photodiode.

This second approach has the advantage of greatly reducing the requirements on the emission and absorption spectra of the two scintillators, thereby increasing the number of possible scintillators which can be used for each of the functions (gamma and neutron detection).

This approach contrasts to the first approach shown in FIG. 1, wherein two scintillators (12, 14) are used, and the scintillators are optically linked or combined in an overall sensing element 10 to achieve detection of both gamma and neutron radiation. The two scintillators are optically coupled to each other and to a photosensing element 18. This approach may have performance limitations if either of the scintillators have optical absorption within the wavelength range of the emission from the other scintillator. In this happens, the absorption of the scintillation photons from one or both of the scintillators may reduce the number of photons that are detected and may also make the number of photons detected for each event (gamma or neutron absorption) more dependent on the position of interaction of the radiation within the scintillators. Additionally, a reduction in the number of scintillation photons detected will reduce the signal-to-noise ratio, resulting in degraded energy resolution (for gamma rays) and reduced ability to discriminate between gamma and neutron radiation. An increase in the variation in the detected signal as a function of interaction position will also degrade the energy resolution of the detector (for gamma rays) and may degrade the discrimination function. Therefore, as discussed above, the first approach works very well but requires that suitable scintillators be used.

Therefore, the second approach overcomes the need for optical coupling between the two scintillators by using novel design concepts.

Two general classes of design modifications are described below as follows: 1) use of wavelength-shifting fiber to couple one of the scintillators to the photosensor while directly coupling the second scintillator to the photosensor OR 2) using a second photosensor, such as a photodiode, to readout the second scintillator.

The modifications for the two classes of designs (Class 1 and Class 2) are described below:

Class 1

Figure 2:
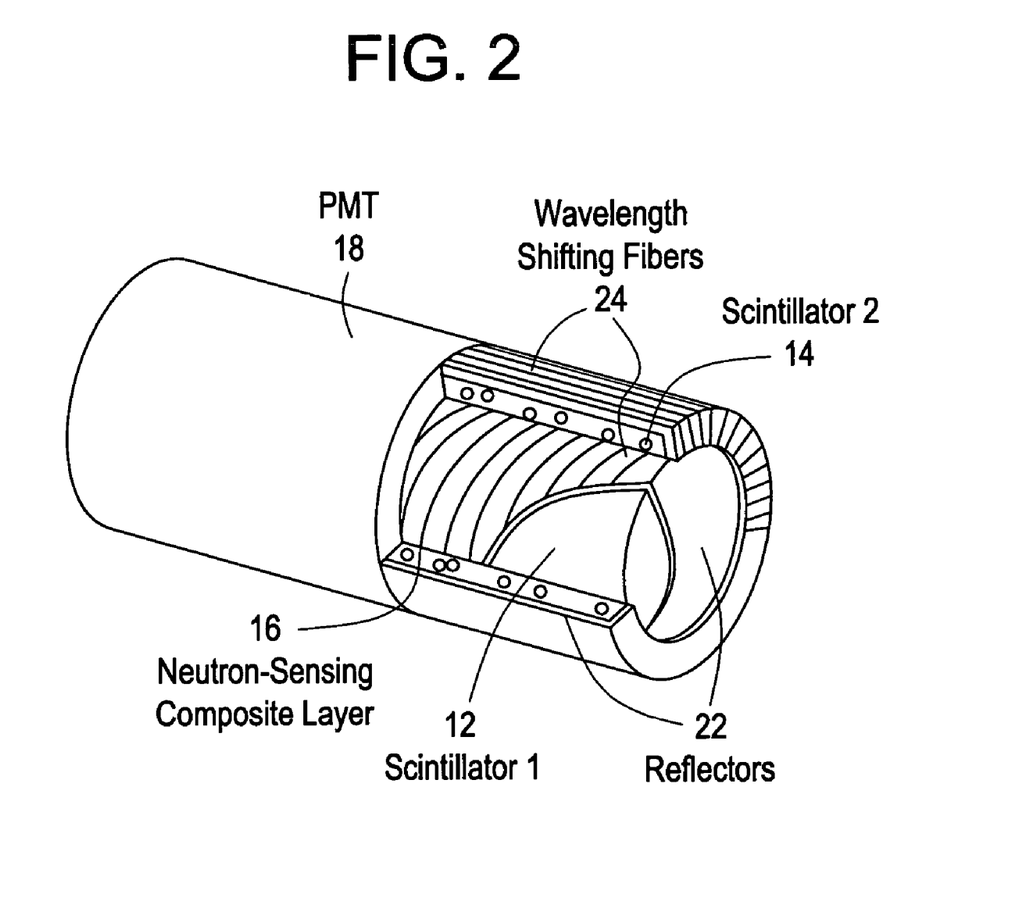
FIG. 2 shows a perspective view of another embodiment having wavelength shifting fibers.
Figure 3:
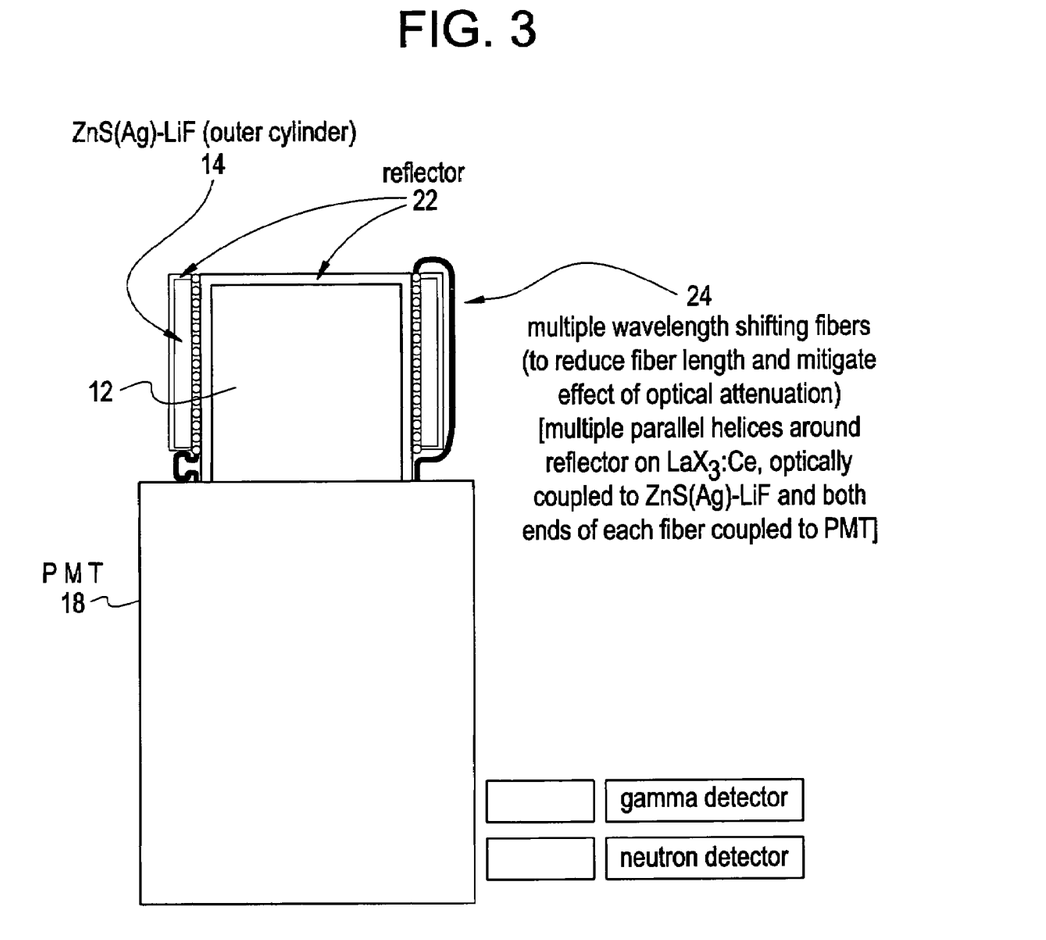
FIG. 3 is an example of a design wherein the two scintillators are not optically coupled.

As first shown in the embodiment of FIGS. 2 and 3, in Class 1 designs, one scintillator, in this case the first scintillator 12 is coupled directly to the photosensor (a photomultiplier tube (PMT) 18, for example), and the remaining surfaces of the scintillator 12 are covered with an appropriate reflecting material 22 (to improve the light collection efficiency). The second scintillator 14 is in this case located radially and is coupled (on at least one surface) to wavelength-shifting fibers 24 (with the remaining surfaces covered with an appropriate reflector material). Optical photons emitted from the second scintillator 14 are absorbed by the wavelength-shifting fibers 24. This energy is then re-emitted at a longer wavelength within the fiber (note: the wavelength shift is a natural consequence of the absorption and re-emission process, but the change in wavelength is not a requirement for this invention). A fraction of the re-emitted photons are emitted within the numerical aperture of the fiber, and these photons are guided by the fiber to the photosensor. Several possible embodiments of this design are shown in the Figures as described in detail below.

FIG. 3: Is an example of a design that eliminates the optical coupling between the scintillators. This is a "Class 1" design. The first scintillator 12 is a gamma scintillator (LaX3:Ce in this case) and is coupled directly to the photosensor (shown as a PMT 18). The emission from the second scintillator 14 which is the neutron scintillator [ZnS (Ag)—LiF in this case] is absorbed in the wavelength shifting fibers 24 (multiple fibers in an inter-leaving helix) and then the re-emitted photons are guided to the photosensor. Alternatively, light from the neutron sensing scintillator can be scattered into the fiber, transmitted a distance in the fiber, absorbed in the fiber, and re-emitted and guided to the photosensor. Other fiber geometries other than an interleaving helix may also be used, i.e., other fiber geometries that guide light to the photosensor, as would be understood by those skilled in the art, may also be used.

Figure 4:
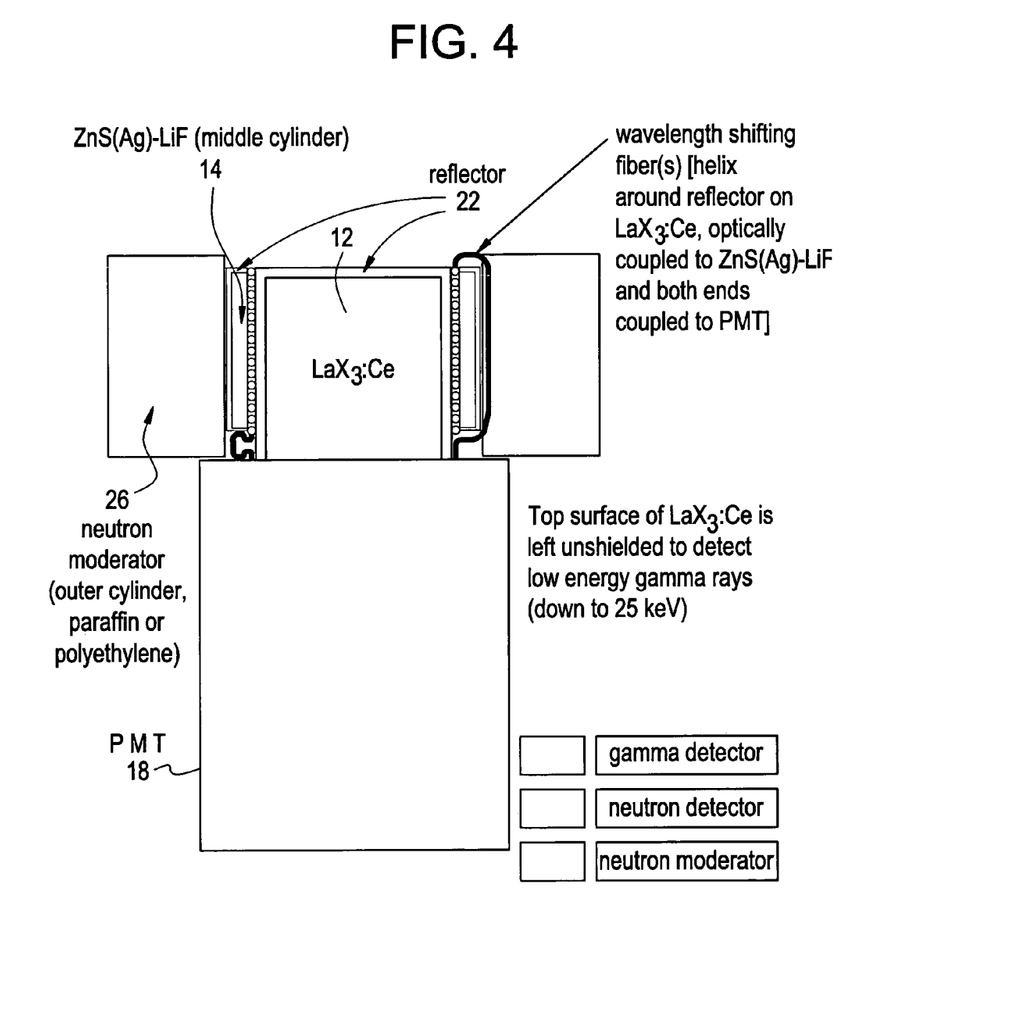
FIG. 4 is an example of a design wherein a moderator is used to thermalize the neutrons before detection.

FIG. 4: Is an example of a design ("Class 1") that includes a moderator 26 to thermalize incident neutrons before detection. One surface of the first scintillator 12 (LaX3:Ce in this case) is left uncovered by the moderator 26 so that low energy gamma rays can be detected without significant attenuation. The moderator could be used with any of the designs in this disclosure.

Figure 5:
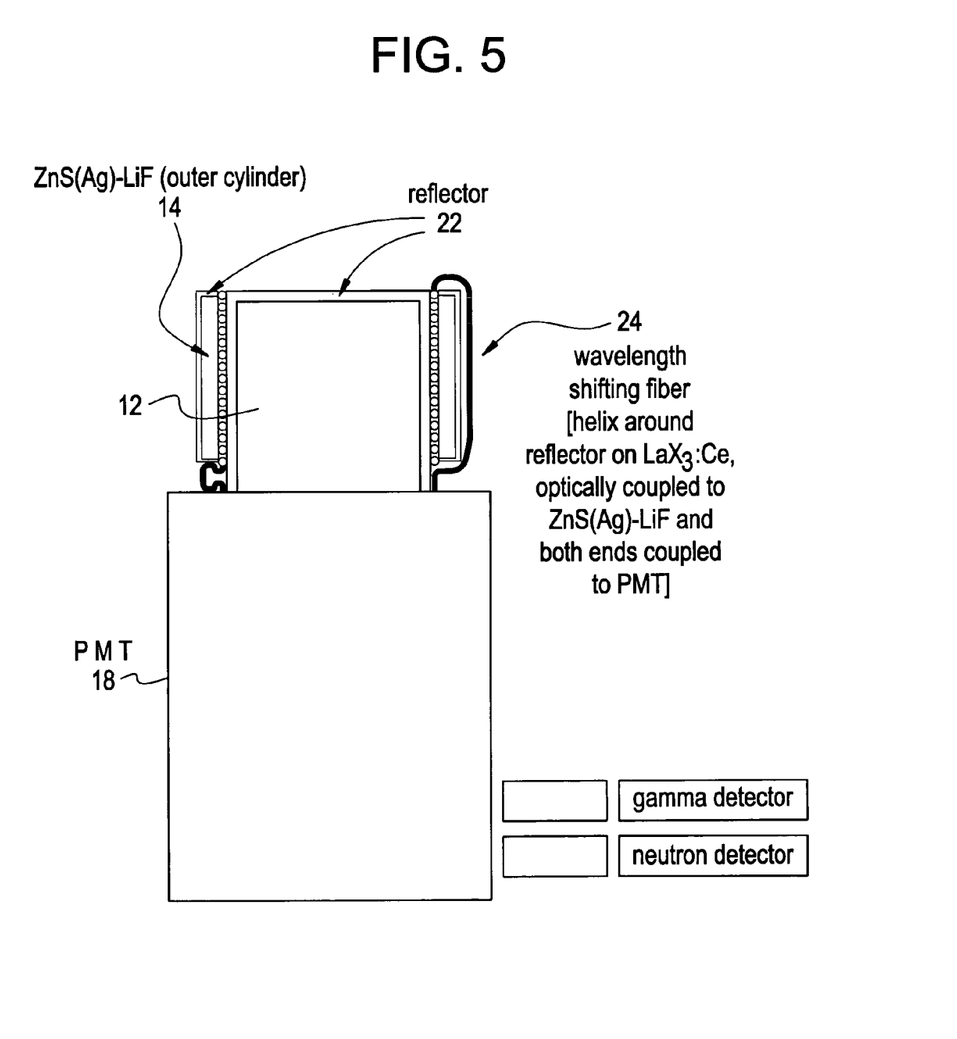
FIG. 5 is an example of a design wherein a single wavelength-shifting fiber is used.

FIG. 5: Is a variation on the design ("Class 1") in FIG. 1. In this case, a single wavelength-shifting fiber 24 is used which is configured in a helix.

Figure 6:
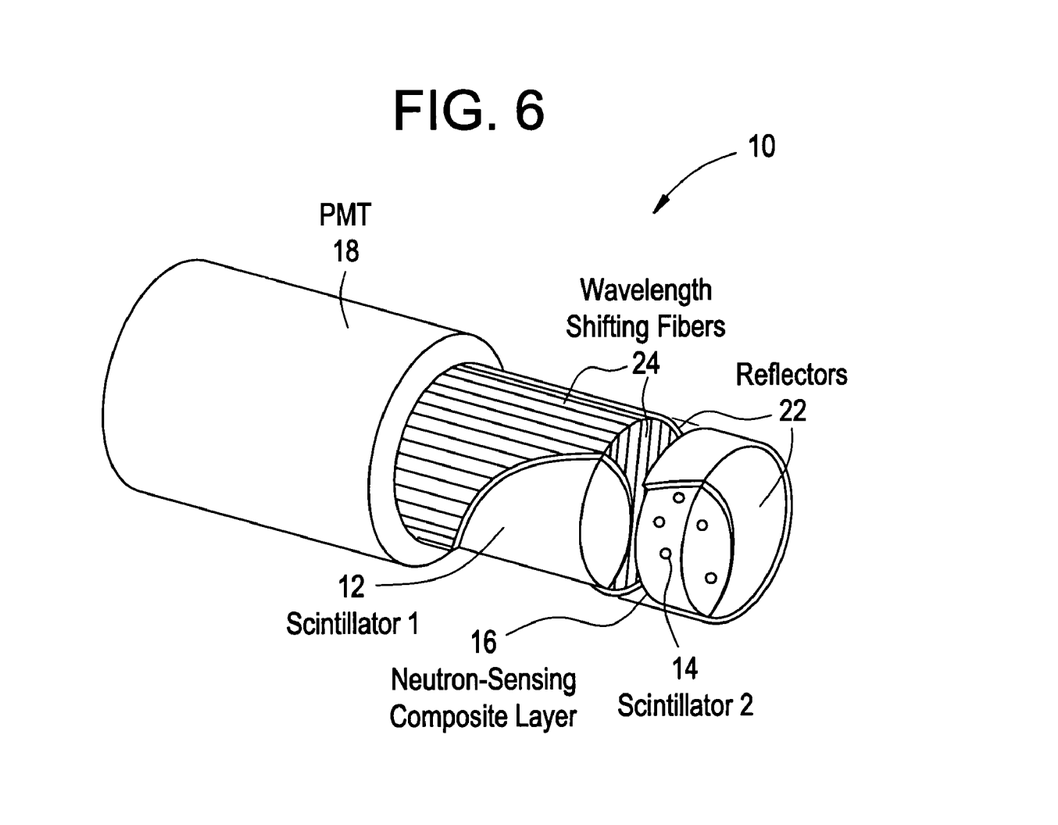
FIG. 6 shows a perspective view of another embodiment having wavelength shifting fibers.

FIG. 6 is a perspective view of an arrangement where the second scintillator 14 is located at the radiation entry end of the overall sensor element 10 and is another variation on the design ("Class 1") using wavelength shifting fibers 24.

Figure 7:
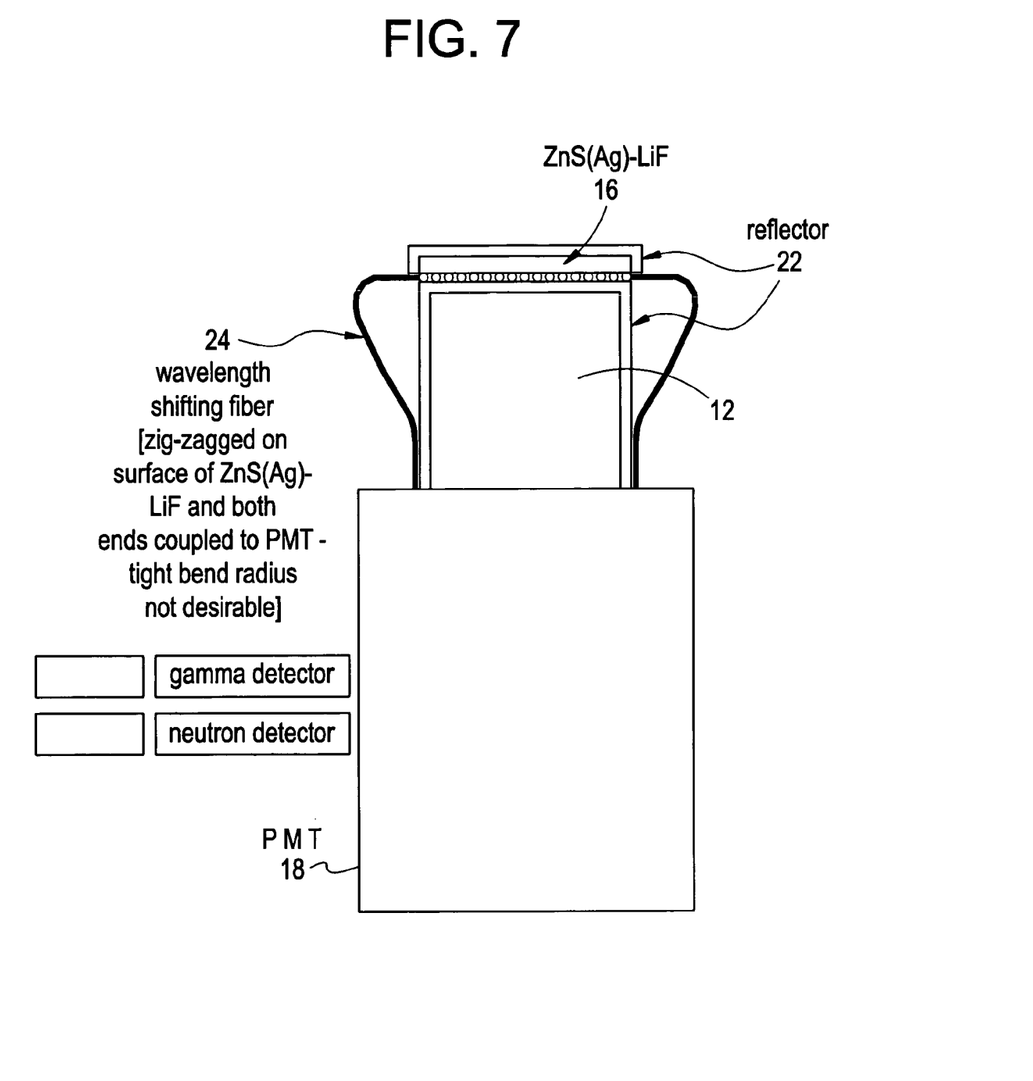
FIG. 7 is another variation using wavelength shifting fibers.

FIG. 7 is another variation on the design ("Class 1") using wavelength shifting fibers wherein the wavelength shifting fibers are zig-zagged on the surface of ZnS(Ag) LiF and both ends coupled to PMT 18.

Figure 8:
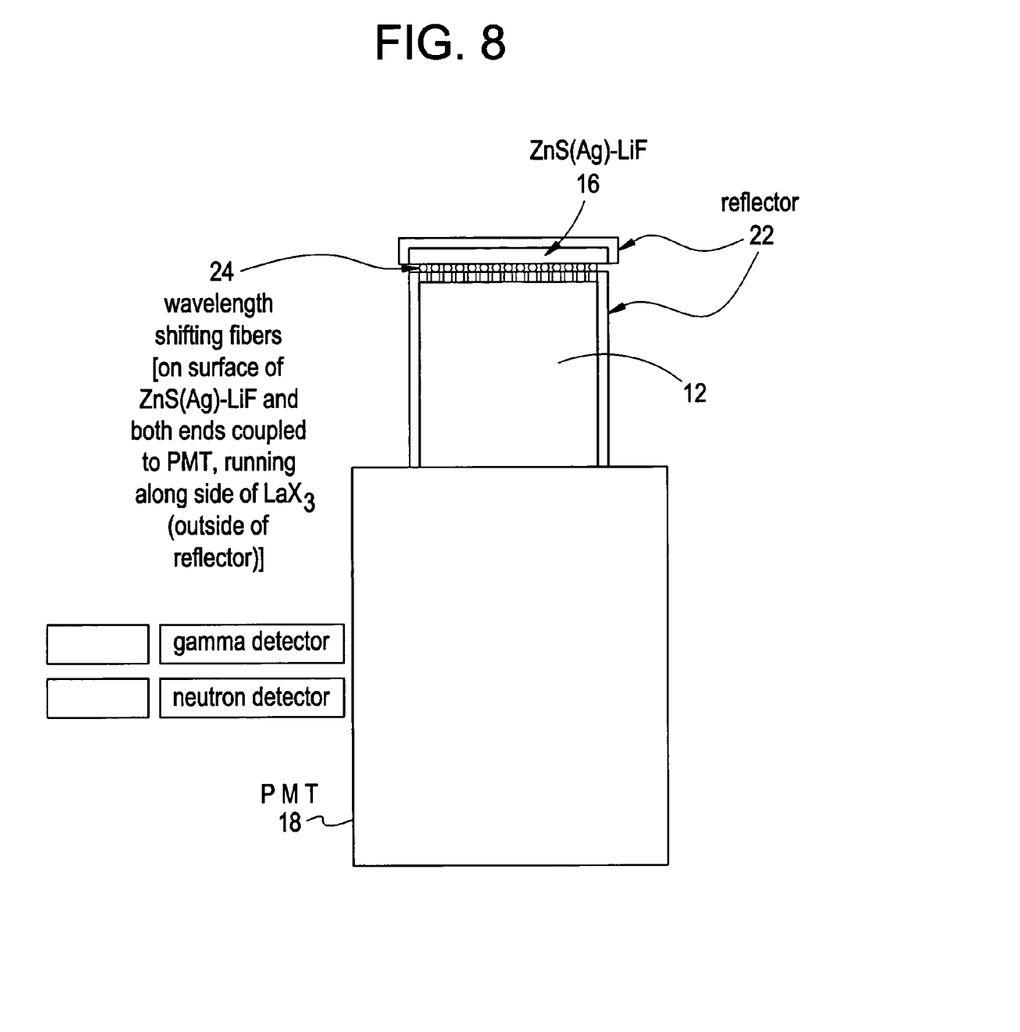
FIG. 8 is an example of a design wherein multiple wavelength-shifting fibers are used.

FIG. 8 is a variation on the design ("Class 1") in FIG. 7. In this case multiple wavelength-shifting fibers 24 are used. The efficiency of the transfer of photons from the neutron scintillator or sensing layer 16 [ZnS(Ag)—LiF in this case] to the photosensor (a PMT 18 in this case) is increased by reducing the total optical path length (by using multiple fibers) and by eliminating any tight bends in the fibers.

Figure 9:
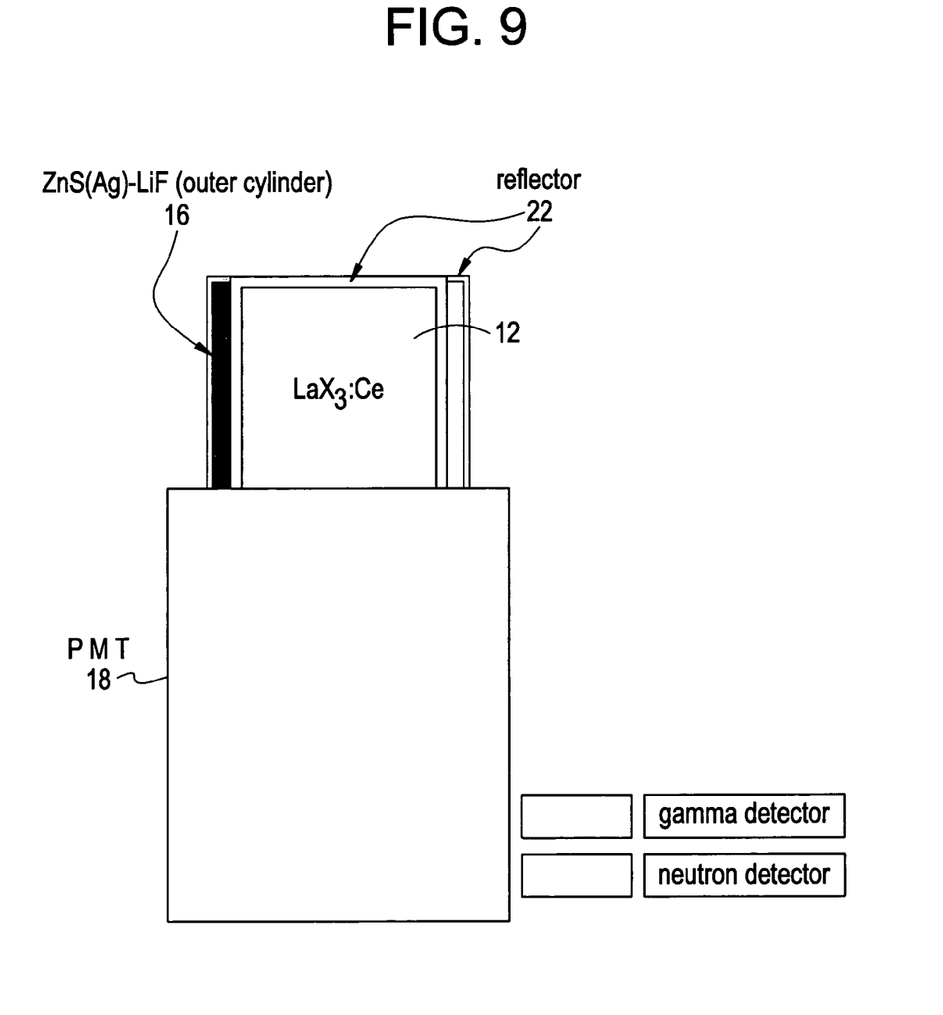
FIG. 9 is an example that does not include wavelength-shifting fibers.

In the figures LaX$_3$:Ce is used as the gamma scintillator 12 and ZnS(Ag)—LiF is used as the neutron scintillator 14. However, these choices are used only as examples as the same design could be used with a wide range of scintillator materials. Because the wavelength-shifting fibers tend to have significant optical absorption, designs which use multiple fibers are generally preferable because they minimize the total optical path length in the fiber (for a fixed coupling area between the scintillator and the wavelength-shifting fiber). Class 1 designs could also include a design in which both scintillators are optically isolated from each other (by appropriate reflecting material) and directly coupled to the photosensor, as shown in FIG. 9.

In another example, the first scintillator activated by gamma radiation may be taken from the group consisting of: $Ce^{3+}$ activated compositions, $CsLnO(Cl,Br,I)_2$ (Ln=rare earth, Y,La), $NaBaLaBr_6$, $BaGdCl_5$, $(Cs,Rb)Ba_2Br_5$; members of the elpasolite family of materials, $LnCl_3$—$LnBr_3$—$LnI_3$ solid solution (Ln=La, and Y), $CeCl_3$—$CeBr_3$—$CeI_3$ solid solutions, $A_2LnX_5$:$Ce^{3+}$ (A=K,Rb,Cs; Ln=La, Y (X=Cl,Br,I) family of materials; $MCl_2$-$MBr_2$ solid solutions (M=Ca,Sr,Ba), and $ABX_3$ where A=Cs, Rb, K, B=Ca, Sr, Ba, Mg, Cd, X=Cl, Br, I.

In another example, the second scintillator may comprise an enriched lithium containing material, for example, LiI, LiYSiO4, LiBaF3, and Li-based glasses. The second scintillator may also comprise a lithium containing material. The second scintillator may also comprise borosilicate glass.

The designs using the wavelength shifting fibers allow for the use of neutron scintillators with relatively poor optical properties. All designs would likely benefit from the addition of a neutron moderator (such as paraffin or polyethylene) to thermalize the neutrons before detection (thermal neutrons have a much higher cross section for interaction in most materials than fast neutrons).

In all of the figures and discussion it was assumed that the neutron scintillator was on the outside of the detector and coupled to the photosensor with wavelength-shifting fibers (in designs that use wavelength-shifting fibers). These assumptions were made for a number of reasons listed below:

1. In most cases, the gamma scintillator would need to be larger in volume than the neutron scintillator because the gamma attenuation length is likely to be much longer than the neutron attenuation length. Therefore, it would be convenient to make the neutron scintillator as a thin layer coupled to the outside of the gamma scintillator.

2. Since gamma rays have relatively long attenuation lengths, most of them will pass through the neutron scintillator without interacting in it. Therefore, including the neutron scintillator as the outer layer does not lead to significant gamma attenuation.

3. The energy deposited in the neutron scintillator is large (4.8 MeV when the lithium reaction is used) compared to the energy deposited in the gamma scintillator. Therefore, it is more likely that good signal-to-noise can be achieved when the neutron scintillator is coupled to the photosensor through wavelength-shifting fibers than the case of coupling the gamma scintillator to the photosensor with wavelength-shifting fibers. Also, for the gamma scintillator it is desired to have good energy resolution, whereas good energy resolution is not needed for the neutron scintillator. Therefore, the neutron detection process is more tolerant of losses in the optical transport system.

Notwithstanding the arguments above, it is intended that this disclosure also covers designs in which the gamma scintillator is coupled to the photosensor through wavelength-shifting fibers and designs in which the geometry of the two scintillators is varied.

Class 2

Figure 10:
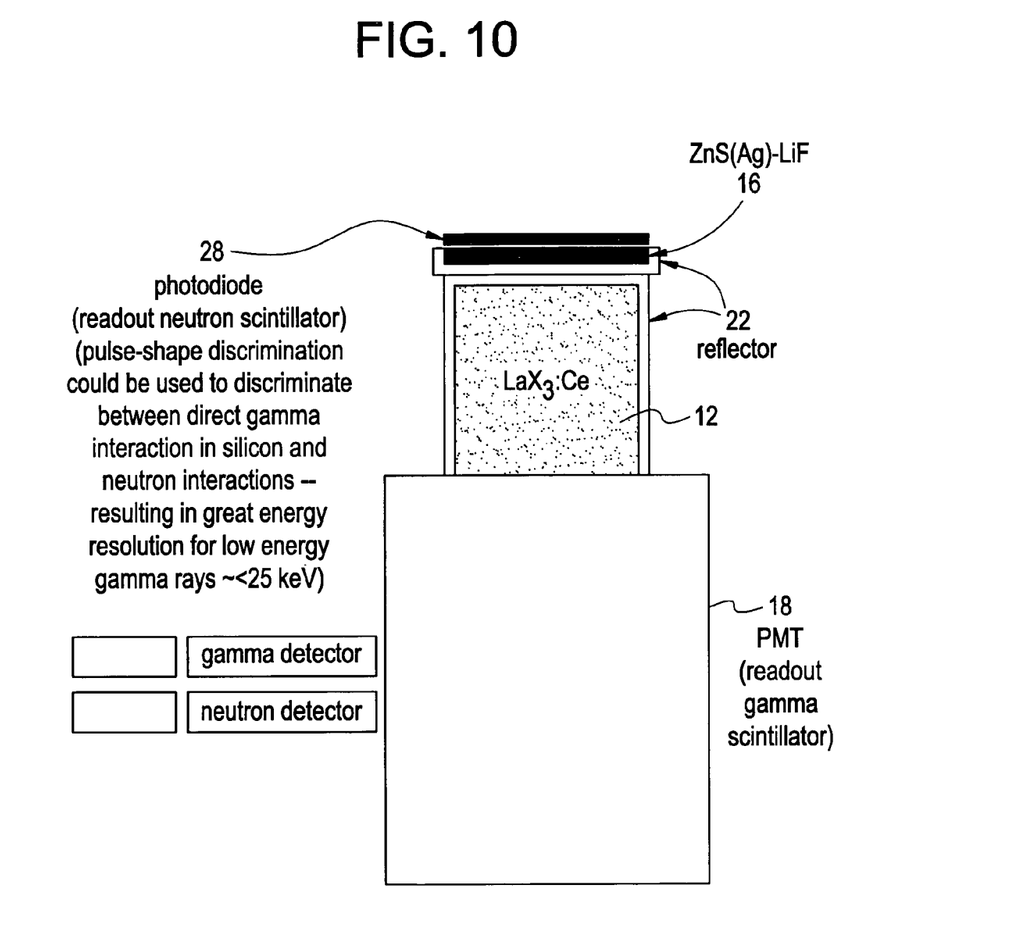
FIG. 10 is an example of a design that eliminates the optical coupling between the scintillators
Figure 11:
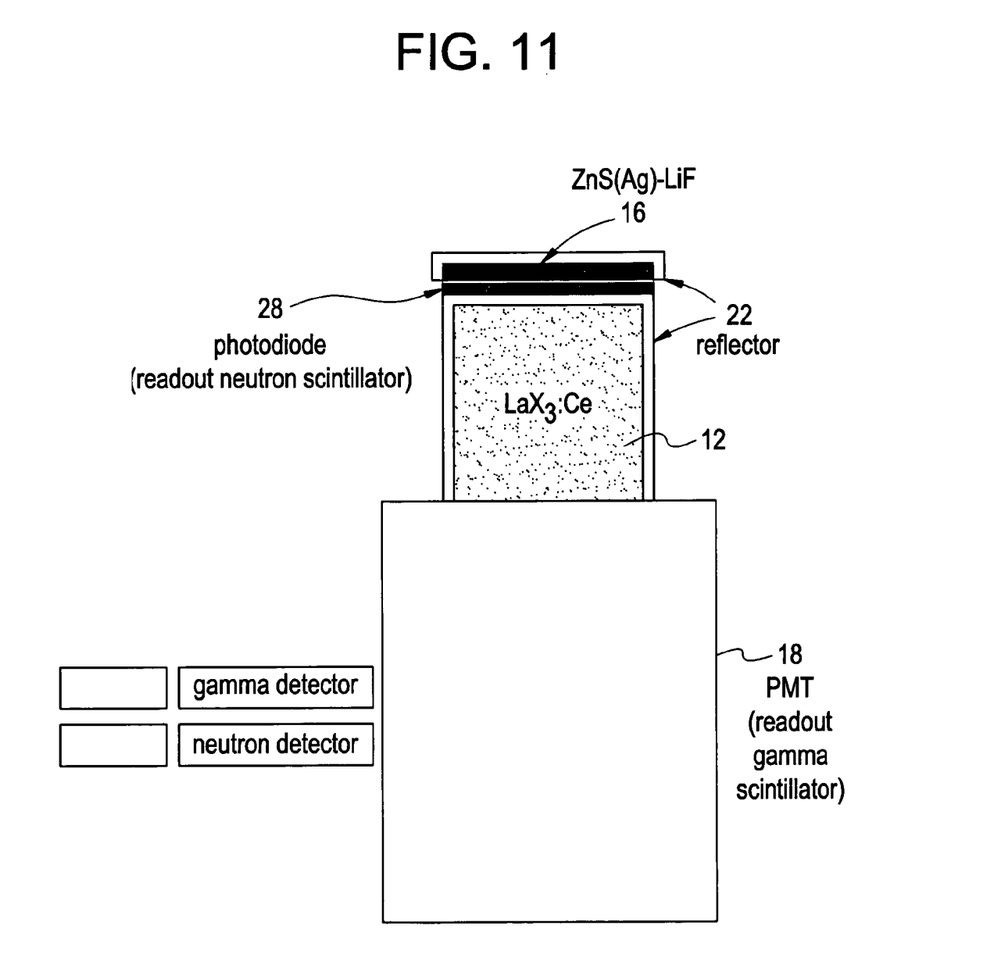
FIG. 11 is an example of a design that eliminates the optical coupling between the scintillators.
Figure 12:
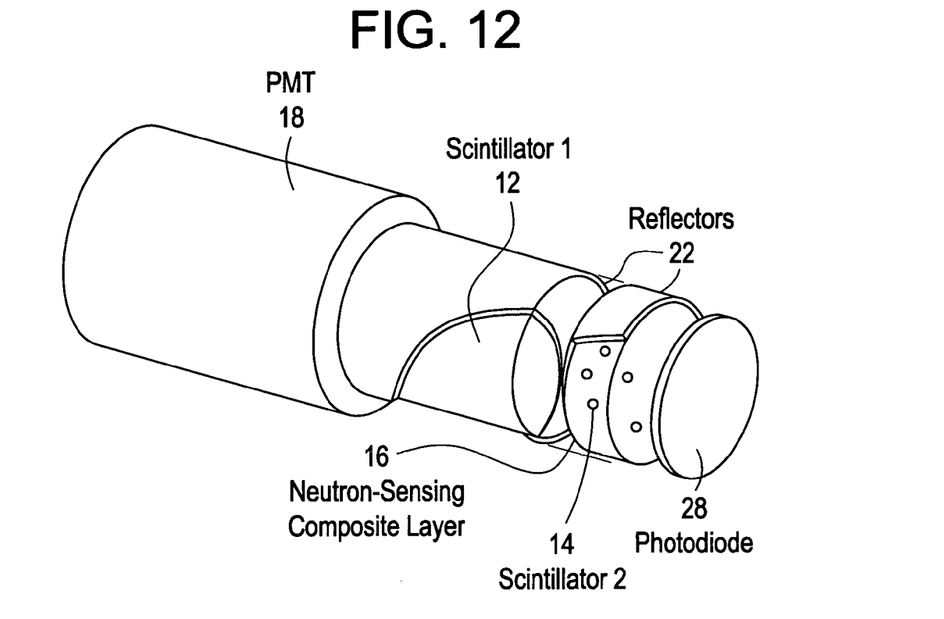
FIG. 12 shows a perspective view of another embodiment without wavelength shifting fibers and a second photosensor placed on the radiation entrance side of the sensor.
Figure 13:
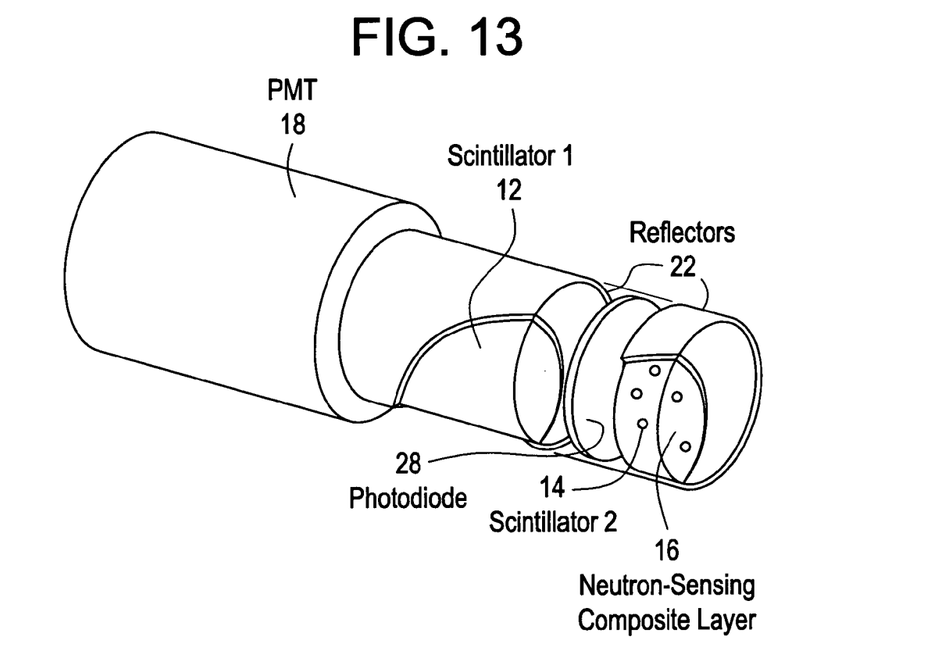
FIG. 13 shows a perspective view of another embodiment without wavelength shifting fibers and a second photosensor placed between the two scintillators.

Class 2: In this class of designs two scintillators are used (one for detecting neutrons and one for detecting gamma rays) and two separate photosensors are used. Each scintillator is directly coupled to one photosensor and the remaining surfaces of each scintillator are covered with a reflecting material (to improve the light collection efficiency). Two such designs are shown in FIGS. 10 and 11. The design shown in FIG. 10 shows inclusion of a photodiode 28 which is used to readout the neutron scintillator is located on the outer surface of the overall detector offers the additional possibility of using the photodiode 28 as a direct conversion detector for low energy (<25 keV, approximately) gamma rays. Using pulse shape discrimination the direct-conversion events from gamma rays absorbed in the diode could be discriminated from the signals from neutron interactions in the neutron scintillator. Additional, embodiments showing use of a photodiode are shown in FIGS. 12 and 13.

In the discussion above photosensor could include (but is not limited to) photomultiplier tubes, photodiodes, avalanche photodiodes, and Geiger-mode diodes.

This second approach overcomes the need for optical coupling between the two scintillators by using novel design concepts. This approach provides the following advantages:

1. Since the two scintillators are not optically coupled, the choice of scintillator materials can be made without consideration for interactions between emission in one scintillator and absorption in the other scintillator. This simplifies the selection of scintillator materials and allows for combinations that would not be effective if the two scintillators were optically coupled. It further relieves the constraint that the two scintillators have distinguishable decay times.

2. Simplification of the electronic hardware and software for distinguishing a neutron from a gamma ray. In this approach, the neutron and gamma ray events are distinguished by which photosensor receives a photon signal, rather than by the decay time difference between the two scintillation materials. This relieves the need for more sophisticated time domain analysis of the signal generated in single photosensor in Case 1.

In designs (such as the one shown in FIG. 7) which use a photodiode or avalanche photodiode (APD) on the outer surface of the detector, this approach has the additional advantage of providing high-energy-resolution detection of low energy gamma rays (less than approximately 25 keV) by direct conversion in the photodiode or APD.

Compared to designs in which the two scintillators are optically coupled, this second approach can improve the energy resolution for gamma ray detection by maximizing the uniformity of the light collection within the gamma ray scintillator. Eliminating the need for light generated in the neutron sensing layer to interact in the gamma scintillator enables more flexibility in gamma scintillator design which maximizes the opportunity to select materials with more uniform and lower optical absorption at the gamma scintillator emission wavelengths. This will result in greater light collection uniformity and higher energy resolution.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom.

What is claimed is:

1. A sensing element activated by radiation for use with a photosensor comprising:
    a first scintillator activated by gamma radiation; and
    a neutron sensing layer comprising a second scintillator activated by neutron radiation;
    wherein one scintillator is coupled directly to the photo sensor and the other scintillator is coupled to the photosensor through wavelength-shifting material.

2. The sensing element of claim 1 wherein the first scintillator activated by gamma radiation comprises $Ce^{3+}$ activated $[La(Cl,Br,I)_3]$.

3. The sensing element of claim 1 wherein the first scintillator activated by gamma radiation comprises a lanthanum halide based material.

4. The sensing element of claim 3 wherein the lanthanum halide based material comprises a cerium-doped lanthanum halide.

5. The sensing element of claim 1 wherein the second scintillator comprises ZnS(Ag)—LiF.

6. The sensing element of claim 1 wherein the second scintillator comprises ZnS(Ag)—LiF; and
    the first scintillator comprises a cerium-doped lanthanum halide.

7. The sensing element of claim 1 wherein the first scintillator activated by gamma radiation is from the group consisting of:
    $Ce^{3+}$ activated compositions, $CsLnO(Cl,Br,I)_2$ (Ln=rare earth, Y,La), $NaBaLaBr_6$, $BaGdCl_5$, $(Cs,Rb)Ba_2Br_5$; members of the elpasolite family of materials, $LnCl_3$-$LnBr_3$-$LnI_3$ solid solution (Ln=La,and Y), $CeCl_3$—$CeBr_3$—$CeI_3$ solid solutions, $A_2LnX_5:Ce^{3+}$ (A=K,Rb, Cs; Ln=La, Y (X=Cl,Br,I) family of materials; $MCl_2$-$MBr_2$ solid solutions (M=Ca,Sr,Ba), and $ABX_3$ where A=Cs, Rb, K, B=Ca, Sr, Ba, Mg, Cd, X=Cl, Br, I.

8. The sensing element of claim 1 wherein the second scintillator comprises an enriched lithium containing material.

9. The sensing element of claim 8 wherein the second scintillator comprises an enriched lithium containing material from the group consisting of: LiI, LiYSiO4, LiBaF3, and Li-based glasses.

10. The sensing element of claim 1 wherein the second scintillator comprises a lithium containing material.

11. The sensing element of claim 1 wherein the second scintillator comprises borosilicate glass.

12. The sensing element of claim 1, wherein the wavelength-shifting material comprises wavelength-shifting fibers.

13. A radiation detector allowing both gamma and neutron detection comprising:
    a radiation sensing element comprising a gamma radiation sensing first scintillator and a neutron sensing second scintillator; and
    a photosensor;
    wherein one scintillator is coupled directly to the photo sensor and the other scintillator is coupled to the photosensor through wavelength-shifting material.

14. The radiation detector of claim 13 wherein the first scintillator is a lanthanum halide based material.

15. The radiation detector of claim 13 wherein the second scintillator emits light in the range of 300-500 nm.

16. The radiation detector of claim 13 wherein the second scintillator is structured not to excite the first scintillator and is also not excitable by the first scintillator.

17. The radiation detector of claim 13 wherein the second scintillator comprises a 6LiF/ZnS:Ag composite.

18. The radiation detector of claim 13 wherein the detector is a hand-held or portable detector.

19. The radiation detector of claim 13 wherein the first scintillator activated by gamma radiation comprises $Ce^{3+}$ activated $[La(Cl,Br,I)_3]$.

20. The radiation detector of claim 13 wherein the first scintillator and the second scintillator are optically connected such that the light from one scintillator passes through the other.

21. The radiation detector of claim 13 wherein the first scintillator and the second scintillator are optically separated.

22. The radiation detector of claim 13, wherein the wavelength-shifting material comprises wavelength-shifting fibers.

23. The radiation detector of claim 13 further comprising: a moderating material to thermalize the neutrons before detection in order to increase detection efficiency.

24. The radiation detector of claim 13 wherein the second scintillator has a primarily speed distinct from that of the first scintillator.

25. The radiation detector of claim 13 wherein the first scintillator for sensing gamma radiation is from the group consisting of:
$Ce^{3+}$ activated compositions, $CsLnO(Cl,Br,I)_2$ (Ln=rare earth, Y,La), $NaBaLaBr_6$, $BaGdCl_5$, $(Cs,Rb)Ba_2Br_5$; members of the elpasolite family of materials, $LnCl_3$-$LnBr_3$-$LnI_3$ solid solution (Ln=La, and Y), $CeCl_3$—$CeBr_3$—$CeI_3$ solid solutions, $A_2LnX_5:Ce^{3+}$ (A=K,Rb, Cs; Ln=La, Y (X=Cl,Br,I) family of materials; $MCl_2$-$MBr_2$ solid solutions (M=Ca,Sr,Ba), and $ABX_3$ where A=Cs, Rb, K, B=Ca, Sr, Ba, Mg, Cd, X=Cl, Br, I.

26. The radiation detector of claim 13 wherein the second scintillator comprises an enriched lithium containing material.

27. The radiation detector of claim 26 wherein the second scintillator comprises an enriched lithium containing material from the group consisting of: LiI, LiYSiO4, LiBaF3, and Li-based glasses.

28. The radiation detector of claim 13 wherein the second scintillator comprises a lithium containing material.

29. The radiation detector of claim 13 wherein the second scintillator comprises borosilicate glass.

30. A radiation detector allowing both gamma and neutron detection comprising:
a radiation sensing element comprising a gamma radiation sensing first scintillator and a neutron sensing second scintillator;
a photosensor; and
a photodiode;
wherein the photodiode is used for both reading the second scintillator for neutrons and for direct detection of low energy gamma rays, and the detector is structured with pulse-shape discrimination capability to discriminate between low energy gamma rays and neutrons.

31. A radiation detector allowing both gamma and neutron detection comprising:
a radiation sensing element comprising a gamma radiation sensing first scintillator and a neutron sensing second scintillator; and
a photosensor;
wherein the first scintillator is an inner cylinder that is coupled directly to the photosensor and the second scintillator is an outer cylinder that is coupled to multiple wavelength-shifting optical fibers which are arranged in an inter-leaving helix pattern and connected on both ends to the photosensor.

* * * * *

UNITED STATES PATENT AND TRADEMARK OFFICE
CERTIFICATE OF CORRECTION

PATENT NO. : 7,335,891 B2
APPLICATION NO. : 11/160500
DATED : February 26, 2008
INVENTOR(S) : Timothy Albert Kniss et al.

It is certified that error appears in the above-identified patent and that said Letters Patent is hereby corrected as shown below:

In column 1, line 22, delete "Occuring" and insert -- Occurring --, therefor.

In column 2, line 19, after "scintillators" insert -- . --.

In column 2, line 62, delete "LaX3:Ce" and insert -- $LaX_3:Ce$ --, therefor.

In column 3, line 35-36, delete "cyrogenic" and insert -- cryogenic --, therefor.

In column 5, line 19, delete "(LaX3:Ce" and insert -- ($LaX_3:Ce$ --, therefor.

In column 5, line 34, delete "(LaX3:Ce" and insert -- ($LaX_3:Ce$ --, therefor.

In column 5, line 48, delete "ZnS(Ag) LiF" and insert -- ZnS(Ag)–LiF --, therefor.

In column 8, line 22, in claim 7, delete "(Ln=La,and" and insert -- (Ln=La, and --, therefor.

In column 9, line 11, in claim 24, delete "primarily" and insert -- primary --, therefor.

Signed and Sealed this
Twentieth Day of March, 2012

David J. Kappos
*Director of the United States Patent and Trademark Office*